United States Patent
Kim et al.

(10) Patent No.: US 10,623,496 B2
(45) Date of Patent: Apr. 14, 2020

(54) OPERATION METHODS OF COMMUNICATION NODE IN NETWORK

(71) Applicant: Hyundai Motor Company, Seoul (KR)

(72) Inventors: Woo Sub Kim, Gyeonggi-do (KR);
Sung Ho Choi, Gyeonggi-do (KR);
Seong Jin Park, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 293 days.

(21) Appl. No.: 15/259,490

(22) Filed: Sep. 8, 2016

(65) Prior Publication Data

US 2017/0070576 A1 Mar. 9, 2017
US 2019/0028543 A9 Jan. 24, 2019

(30) Foreign Application Priority Data

Sep. 8, 2015 (KR) ........................ 10-2015-0127142

(51) Int. Cl.
| | |
|---|---|
| *H04L 29/08* | (2006.01) |
| *H04L 12/46* | (2006.01) |
| *H04L 12/58* | (2006.01) |
| *H04L 12/40* | (2006.01) |
| *H04L 12/911* | (2013.01) |
| *H04L 12/927* | (2013.01) |

(52) U.S. Cl.
CPC ............ *H04L 67/12* (2013.01); *H04L 12/462* (2013.01); *H04L 51/18* (2013.01); *H04L 67/1093* (2013.01); *H04L 67/20* (2013.01); *H04L 67/322* (2013.01); *H04L 67/325* (2013.01); *H04L 2012/40215* (2013.01); *H04L 2012/40273* (2013.01)

(58) Field of Classification Search
CPC .................. H04L 67/12; H04L 12/462; H04L 2012/40273; H04L 2012/40215
See application file for complete search history.

(56) References Cited

U.S. PATENT DOCUMENTS

| | | | |
|---|---|---|---|
| 2014/0197281 A1* | 7/2014 | Kraeling | B61L 25/028 246/1 R |
| 2014/0215491 A1* | 7/2014 | Addepalli | H04W 4/046 719/313 |
| 2015/0029987 A1* | 1/2015 | Addepalli | H04W 4/046 370/329 |
| 2015/0223273 A1* | 8/2015 | Macdonald | G08C 17/02 370/252 |
| 2015/0264554 A1* | 9/2015 | Addepalli | H04W 4/046 370/328 |
| 2019/0020985 A1* | 1/2019 | Dai | H04W 4/046 |

* cited by examiner

*Primary Examiner* — Alex Skripnikov
*Assistant Examiner* — Liem H. Nguyen
(74) *Attorney, Agent, or Firm* — Mintz Levin Cohn Ferris Glovsky and Popeo, P.C.; Peter F. Corless

(57) ABSTRACT

Operation methods of a first communication node in a network, in particular, an Ethernet-based vehicle network, include: transmitting, by the first communication node to at least one communication node which is connected to the first communication node, a first frame requesting state information of a physical layer between the first communication node and the at least one communication node; receiving, by the first communication node from the at least one communication node, a second frame in response to the first frame; and identifying, by the first communication node, a state of the physical layer based on the second frame when the second frame is received.

16 Claims, 5 Drawing Sheets

OPERATION METHODS OF COMMUNICATION NODE IN NETWORK

CROSS-REFERENCE TO RELATED APPLICATIONS

This application claims under 35 U.S.C. § 119(a) the benefit of Korean Patent Application No. 10-2015-0127142 filed on Sep. 8, 2015 in the Korean Intellectual Property Office (KIPO), the entire contents of which are incorporated by reference herein.

BACKGROUND

1. Technical Field

The present disclosure relates generally to operation of a communication node in a network, and more specifically, to methods for analyzing a state of a physical layer and setting a communication path based on the analyzed state of the physical layer.

2. Description of the Related Art

Along with the rapid digitalization of vehicle parts, the number and variety of electronic devices installed within a vehicle have been increasing significantly. Electronic devices may currently be used throughout the vehicle, such as in a power train control system, a body control system, a chassis control system, a vehicle network, a multimedia system, and the like. The power train control system may include an engine control system, an automatic transmission control system, etc. The body control system may include a body electronic equipment control system, a convenience apparatus control system, a lamp control system, etc. The chassis control system may include a steering apparatus control system, a brake control system, a suspension control system, etc. The vehicle network may include a controller area network (CAN), a FlexRay-based network, a media oriented system transport (MOST)-based network, etc. The multimedia system may include a navigation apparatus system, a telematics system, an infotainment system, etc.

Such systems and electronic devices constituting each of the systems are connected via the vehicle network, which supports functions of the electronic devices. For instance, the CAN may support a transmission rate of up to 1 Mbps and may support automatic retransmission of colliding messages, error detection based on a cycle redundancy interface (CRC), etc. The FlexRay-based network may support a transmission rate of up to 10 Mbps and may support simultaneous transmission of data through two channels, synchronous data transmission, etc. The MOST-based network is a communication network for high-quality multimedia, which may support a transmission rate of up to 150 Mbps.

Meanwhile, the telematics system, the infotainment system, as well as enhanced safety systems of a vehicle require higher transmission rates and system expandability. However, the CAN, FlexRay-based network, or the like may not sufficiently support such requirements. The MOST-based network may support a higher transmission rate than the CAN and the FlexRay-based network. However, costs increase to apply the MOST-based network to all vehicle networks. Due to these limitations, an Ethernet-based network may be considered as a vehicle network. The Ethernet-based network may support bi-directional communication through one pair of windings and may support a transmission rate of up to 10 Gbps.

The Ethernet-based vehicle network may include a plurality of communication nodes. The communication node may be a gateway, a switch (or, bridge), an end node, etc. The communication node may be connected to a counterpart communication node through a physical layer (e.g., physical link). The communication node may transmit and receive a frame through the physical layer. Here, reliability of the physical layer should be granted in order to successfully transmit and receive the frame. Therefore, methods for analyzing a state of the physical layer and setting a communication path based on the analyzed state of the physical layer are necessary.

SUMMARY

The present disclosure provides a method and an apparatus for analyzing a state of a physical layer in an Ethernet-based vehicle network. In addition, embodiments of the present disclosure further provide a method and an apparatus for setting a communication path based on the analyzed state of the physical layer in the Ethernet-based vehicle network.

In accordance with the embodiments of the present disclosure, an operation method of a first communication node in an Ethernet-based vehicle network may be provided. The method may comprise transmitting, by the first communication node to at least one communication node which is connected to the first communication node, a first frame requesting state information of a physical layer between the first communication node and the at least one communication node; receiving, by the first communication node from the at least one communication node, a second frame in response to the first frame; and identifying, by the first communication node, a state of the physical layer based on the second frame when the second frame is received.

The state information may be at least one of signal to noise ratio (SNR) information and path loss information of the physical layer.

The first frame may include an indicator requesting the state information of the physical layer. In addition, the first frame may include transmission power information of the first frame.

The first frame may be transmitted in a broadcast manner.

The second frame may include at least one of SNR information and path loss information of the physical layer, and the SNR information and the path loss information may be measured based on the first frame. In addition, the second frame may include transmission power information of the second frame.

The first frame may be transmitted when transmission of the state information of the physical layer is requested by an on-board diagnostic (OBD) device which is connected to the first communication node.

Here, each of the first frame and the second frame may be generated based on an Ethernet protocol.

In addition, the method may further comprise transmitting, by the first communication node, a third frame including the identified state information of the physical layer to an OBD device.

In addition, the method may further comprise determining, by the first communication node, whether the identified state of the physical layer is satisfied with a predefined quality criterion; and when the identified state of the physical layer is not satisfied with the predefined quality criterion, transmitting, by the first communication node, a third frame including information of the physical layer which is not satisfied with the predefined quality criterion to an OBD device.

In addition, the method may further comprise determining, by the first communication node, whether the identified state of the physical layer is satisfied with a predefined quality criterion; and when the identified state of the physical layer is not satisfied with the predefined quality criterion, setting, by the first communication node, a communication path based on at least one physical layer except for the physical layer which is not satisfied with the predefined quality criterion.

Further, in accordance with the embodiments of the present disclosure, an operation method of a first communication node in an Ethernet-based vehicle network may be provided. The method may comprise receiving, by the first communication node from a second communication node, a first frame requesting state information of a physical layer between the first communication node and the second communication node; and transmitting, by the first communication node, a second frame including state information of the physical layer to the second communication node when the first frame is received.

The state information may be at least one of signal to noise ratio (SNR) information and path loss information of the physical layer.

The first frame may include an indicator requesting the state information of the physical layer. In addition, the first frame may include transmission power information of the first frame.

The second frame may include at least one of SNR information and path loss information of the physical layer, and the SNR information and the path loss information may be measured based on the first frame. In addition, the second frame may include transmission power information of the second frame.

The second communication may be a switch, and the first communication node may be an end node connected to the switch.

Here, each of the first frame and the second frame may be generated based on an Ethernet protocol.

According to the embodiments of the present disclosure, the state of the physical layer (e.g., SNR, path loss, whether breaking of the physical layer occurs, etc.) between the communication nodes can be identified. When measured SNR is less than a predefined SNR (or, when measured path loss is more than a predefined path loss, when the physical layer is broken), the communication path for transmitting and receiving the frame can be reset. Therefore, a performance of the vehicle network can be enhanced.

BRIEF DESCRIPTION OF DRAWINGS

Embodiments of the present disclosure will become more apparent by describing in detail embodiments of the present disclosure with reference to the accompanying drawings, in which.

Figure 1:
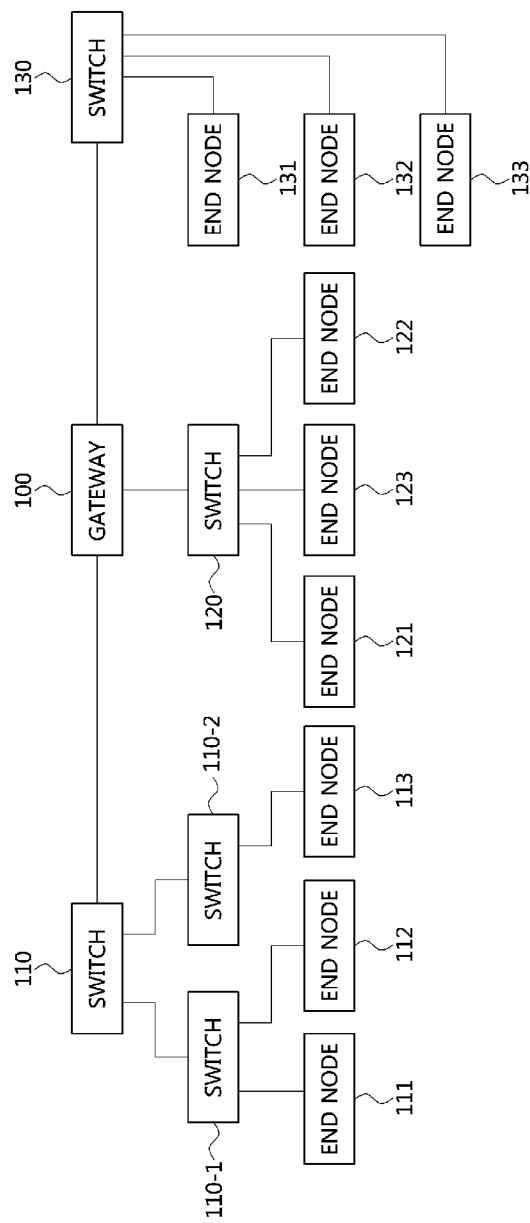
FIG. 1 is a diagram showing a vehicle network topology according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although embodiments are described herein as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Further, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several embodiments, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term 'and/or' means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, embodiments of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a diagram showing a vehicle network topology according to embodiments of the present disclosure.

As shown in FIG. 1, a communication node included in the vehicle network may be a gateway, a switch (or bridge), or an end node. The gateway 100 may be connected with at least one switch 110, 110-1, 110-2, 120, and 130 and may be configured to connect different networks. For example, the gateway 100 may support connection between a switch which supports a controller area network (CAN) (e.g., FlexRay, media oriented system transport (MOST), or local interconnect network (LIN)) protocol and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of end nodes 111, 112, 113, 121, 122, 123, 131, 132, and 133 connected to the switch.

The end nodes 111, 112, 113, 121, 122, 123, 131, 132, and 133 may include an electronic control unit (ECU) configured to control various types of devices mounted within a vehicle. For example, the end nodes 111, 112, 113, 121, 122, 123, 131, 132, and 133 may include the ECU included in an infotainment device (e.g., a display device, a navigation device, and an around view monitoring device).

The communication nodes (e.g., a gateway, a switch, an end node, or the like) included in the vehicle network may be connected in a star topology, a bus topology, a ring topology, a tree topology, a mesh topology, etc. In addition, the communication nodes of the vehicle network may support the CAN protocol, the FlexRay protocol, the MOST protocol, the LIN protocol, or the Ethernet protocol. Embodiments of the present disclosure may be applied to the foregoing network topologies. The network topology to which embodiments of the present disclosure may be applied is not limited thereto and may be configured in various ways.

Figure 2:
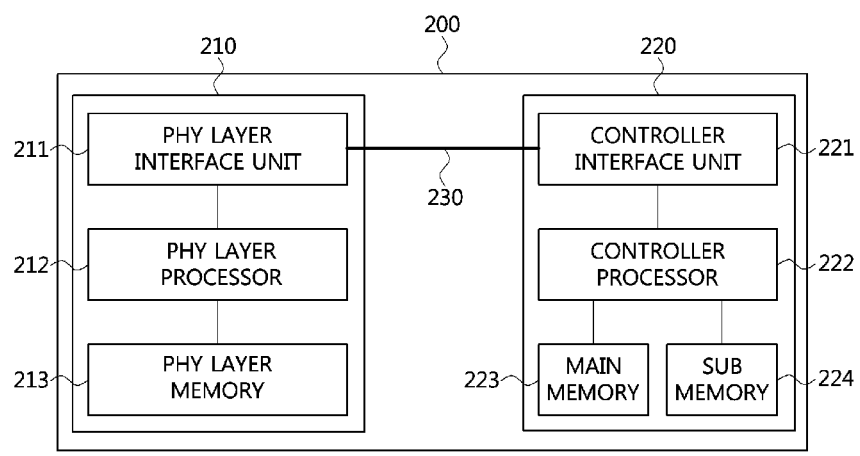
FIG. 2 is a diagram showing a communication node constituting a vehicle network according to embodiments of the present disclosure.

FIG. 2 is a diagram showing a communication node constituting a vehicle network according to embodiments of the present disclosure. Notably, the various methods discussed herein below may be executed by a controller having a processor and a memory.

As shown in FIG. 2, a communication node 200 of a network may include a PHY layer unit 210 and a controller unit 220. In addition, the communication node 200 may further include a regulator (not shown) for supplying power. In particular, the controller unit 220 may be implemented to include a medium access control (MAC) layer. A PHY layer unit 210 may be configured to receive or transmit signals from or to another communication node. The controller unit 220 may be configured to control the PHY layer unit 210 and perform various functions (e.g., an infotainment function, etc.). The PHY layer unit 210 and the controller unit 220 may be implemented as one system on chip (SoC), or alternatively may be implemented as separate chips.

Further, the PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer unit 210 may include a PHY layer interface unit 211, a PHY layer processor 212, and a PHY layer memory 213. The configuration of the PHY layer unit 210 is not limited thereto, and the PHY layer unit 210 may be configured in various ways. The PHY layer interface unit 211 may be configured to transmit a signal received from the controller unit 220 to the PHY layer processor 212 and transmit a signal received from the PHY layer processor 212 to the controller unit 220. The PHY layer processor 212 may be configured to execute operations of the PHY layer interface unit 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller unit 220 may be configured to monitor and control the PHY layer unit 210 using the MII 230. The controller unit 220 may include a controller interface unit 221, a controller processor 222, a main memory 223, and a sub memory 224. The configuration of the controller unit 220 is not limited thereto, and the controller unit 220 may be configured in various ways. The controller interface unit 221 may be configured to receive a signal from the PHY layer unit 210 (e.g., the PHY layer interface unit 211) or an upper layer (not shown), transmit the received signal to the controller processor 222, and transmit the signal received from the controller processor 222 to the PHY layer unit 210 or upper layer. The controller processor 222 may further include an independent memory control logic or an integrated memory control logic for controlling the controller interface unit 221, the main memory 223, and the sub memory 224. The memory control logic may be implemented to be included in the main memory 223 and the sub memory 224 or may be implemented to be included in the controller processor 222.

Further, each of the main memory 223 and the sub memory 224 may be configured to store a signal processed by the controller processor 222 and may be configured to output the stored signal based on a request from the controller processor 222. The main memory 223 may be a volatile memory (e.g., a random access memory (RAM)) configured to temporarily store data required for the operation of the controller processor 222. The sub memory 224 may be a non-volatile memory in which an operating system code (e.g., a kernel and a device driver) and an application program code for performing a function of the controller unit 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although the method (e.g., signal transmission or reception) performed by a first communication node will be described below, the method is applicable to a second communication node that corresponds to the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 3:
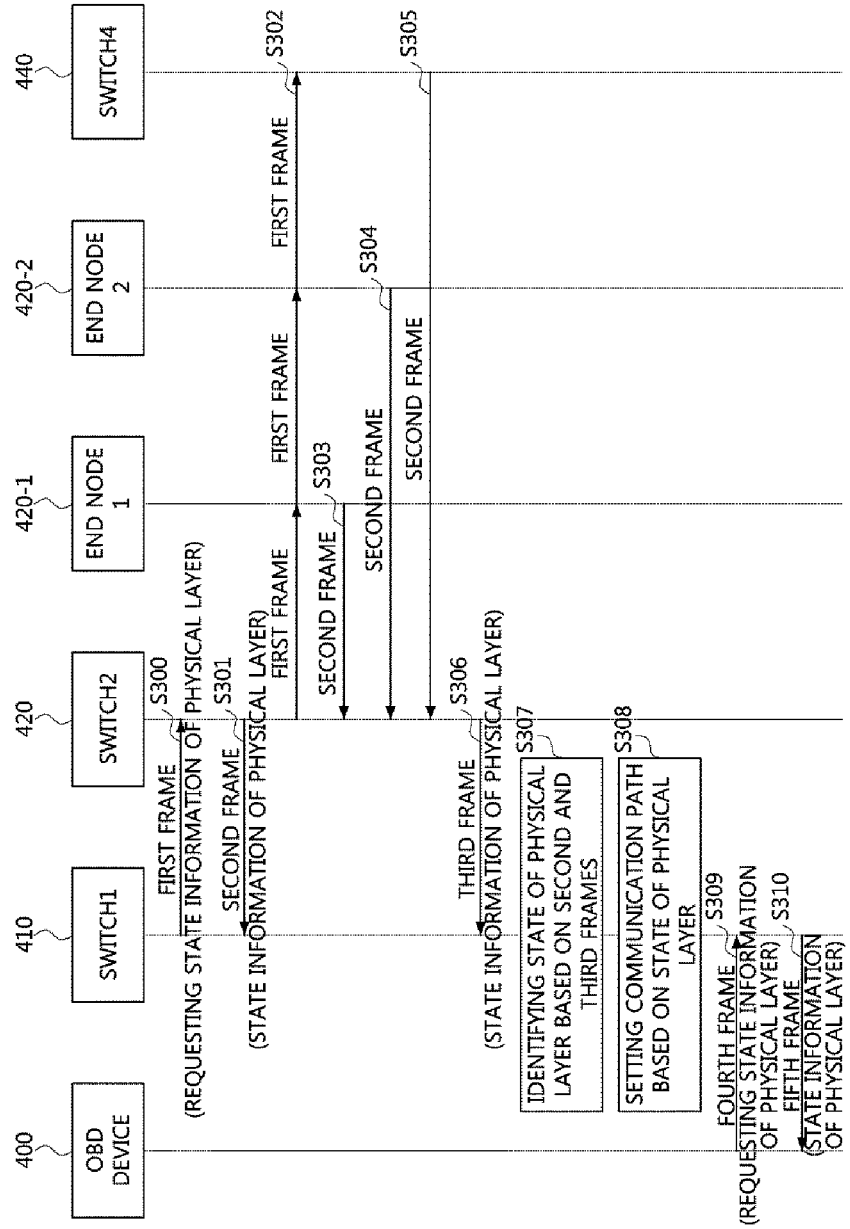
FIG. 3 is a sequence chart showing an operation method of a communication node according to embodiments of the present disclosure.
Figure 4:
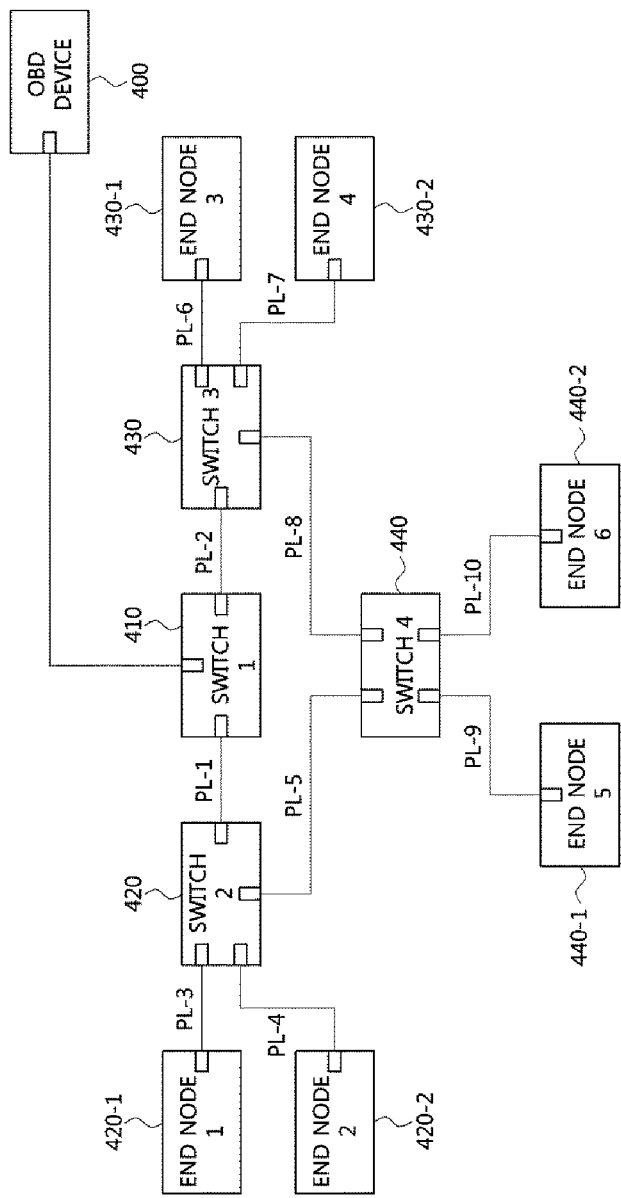
FIG. 4 is a block diagram showing an Ethernet-based vehicle network in which an operation method of a communication node is performed.

FIG. 3 is a sequence chart showing an operation method of a communication node according to embodiments of the present disclosure, and FIG. 4 is a block diagram showing an Ethernet-based vehicle network in which an operation method of a communication node is performed.

As shown FIGS. 3 and 4, the Ethernet-based vehicle network may include a plurality of switches 410, 420, 430, and 440 and a plurality of end nodes 420-1, 420-2, 430-1, 430-2, 440-1, and 440-2. Here, each of the plurality of switches 410, 420, 430, and 440 and the plurality of end nodes 420-1, 420-2, 430-1, 430-2, 440-1, and 440-2 may be the foregoing communication node shown in FIG. 2. The switch1 410 may connect to each of the switch2 420 and the switch3 430 through a physical layer (e.g., physical link) in a one-to-one manner, and transmit or receive a frame to or from each of the switch2 420 and the switch3 430 through the physical layer. Here, a physical layer between the switch1 410 and the switch2 420 may be referred to as a "PL-1," and a physical layer between the switch1 410 and the switch3 430 may be referred to as a "PL-2." Also, The switch1 410 may connect to an on-board diagnostic (OBD) device 400 through a physical layer in the one-to-one manner. The OBD device 400 may be used for diagnosing a state of the communication node, a state of the physical layer between the communication nodes included in the Ethernet-based vehicle network, etc.

The switch2 420 may connect to the switch1 410, the switch4 440, the end node1 420-1, and the end node2 420-2 through a physical layer in the one-to-one manner, and transmit or receive a frame to or from each of the switch1 410, the switch4 440, the end node1 420-1, and the end node2 420-2 through the physical layer. Here, a physical layer between the switch2 420 and the end node1 420-1 may be referred to as a "PL-3," a physical layer between the switch2 420 and the end node2 420-2 may be referred to as a "PL-4," and a physical layer between the switch2 420 and the switch4 440 may be referred to as a "PL-5."

The switch3 430 may connect to the switch1 410, the switch4 440, the end node3 430-1, and the end node4 430-2 through a physical layer in the one-to-one manner, and transmit or receive a frame to or from each of the switch1 410, the switch4 440, the end node3 430-1, and the end node4 430-2 through the physical. Here, a physical layer between the switch3 430 and the end node3 430-1 may be referred to as a "PL-6," a physical layer between the switch3 430 and the end node4 430-2 may be referred to as a "PL-7," and a physical layer between the switch3 430 and the switch4 440 may be referred to as a "PL-8."

The switch4 440 may connect to the switch2 420, the switch3 430, the end node5 440-1, and the end node6 440-2 through a physical layer in the one-to-one manner, and transmit or receive a frame to or from each of the switch2 420, the switch3 430, the end node5 440-1, and the end node6 440-2 through the physical layer. Here, a physical layer between the switch4 440 and the end node5 440-1 may be referred to as a "PL-9," and a physical layer between the switch4 440 and the end node6 440-2 may be referred to as a "PL-10."

The Ethernet-based vehicle network in which operation methods of the communication node according to embodiments of the present disclosure is not limited thereto, and the operation methods of the communication node according to embodiments of the present disclosure may be performed in various Ethernet-based vehicle networks.

The switch1 410 may be a communication node having an analysis function of the state of the physical layer, a set function of a communication path, etc. The switch1 410 may generate a first frame requesting state information of the physical layer. Here, when transmission of the state information of the physical layer is requested by the OBD device 400, the switch1 410 may generate the first frame. Alternatively, the switch1 410 may generate the first frame regardless of the request of the OBD device 400.

The state information may include signal to noise ratio (SNR) information, path loss information of the physical layer, etc. In addition, the state information may further include a result which is determined based on at least one of the SNR information and the path loss of the physical layer. The result may be a normal state indicating that the physical layer is satisfied with a predefined quality criterion or a fault state indicating that the physical layer is not satisfied with the predefined quality criterion. In addition, when the path loss information of the physical layer is requested by the first frame, the first frame may further include transmission power information of the first frame to be used for measuring the path loss.

The first frame may include an indicator requesting the state information of the physical layer. For example, when the indicator included in the first frame is set to binary numeral "0," the indicator may indicate that the state information of the physical layer is not requested. When the indicator included in the first frame is set to binary numeral "1," the indicator may indicate that the state information of the physical layer is requested. For other example, when the indicator included in the first frame is set to binary numeral "00," the indicator may indicate that the state information of the physical layer is not requested. When the indicator included in the first frame is set to binary numeral "01," the indicator may indicate that the SNR information of the physical layer is requested. When the indicator included in the first frame is set to binary numeral "10," the indicator may indicate that the path loss information of the physical layer is requested. When the indicator included in the first frame is set to binary numeral "11," the indicator may indicate that both of the SNR information and the path loss information of the physical layer are requested. Configurations of the indicator are not limited thereto, and the indicator may be configured in various ways.

Meanwhile, a structure of the frame (e.g., first frame, second frame, third frame, fourth frame, fifth frame, etc.) used in the operation methods of the communication node according to the present disclosure may be as follows.

Figure 5:
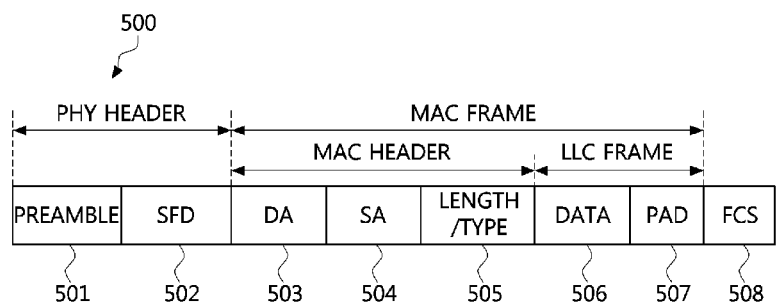
FIG. 5 is block diagram showing embodiments of a frame used in an Ethernet-based vehicle network.

FIG. 5 is block diagram showing embodiments of a frame used in an Ethernet-based vehicle network.

As shown in FIG. 5, a frame 500 may include a PHY header, a MAC frame, and a frame check sequence (FCS) field 508. The MAC frame may be generated by the controller unit 220 of the communication node 200. The PHY header may include a preamble field 501 and a start frame delimiter (SFD) field 502. A size of the preamble 501 may be 7 octets and be used for timing synchronization. The SFD field 502 may have a sequence of "10101011."

The MAC frame may be located after the SFD field 502. The MAC frame may include only a MAC header, or include a MAC header and a logic link control (LLC) frame. The MAC header may include a destination address (DA) field 503, a source address (SA) field 504 and a length/type field 505. A size of the DA field 503 may be 6 octets and include identification information (e.g., MAC address) of the communication node which receives a corresponding MAC frame. A size of the SA field 504 may be 6 octets and include identification information (e.g., MAC address) of the communication node which transmits a corresponding MAC frame.

A size of the length/type field 505 may be 2 octets and indicate a length of a data field 506 or an Ethernet type supported by the communication node which transmits a corresponding protocol-based frame 500. For example, when a first octet value included in the length/type field 505 is less than or equal to decimal number 1500, the length/type field 505 may indicate the length of the data field 506. When the first octet value included in the length/type field 505 is equal to or greater than decimal number 1536, the length/type field 505 may indicate the Ethernet type. The LLC frame may include the data field 506. In addition, the LLC frame may further include a pad field 507 if necessary (e.g., in order to satisfy a minimum size of the MAC frame). Here, the pad field 507 may be added behind the data field 506.

Referring to FIGS. 3 and 4, each of the indicator and the transmission power information may be included in at least one of the MAC header and the data field 506 of the first frame. The switch1 410 may transmit the first frame to the switch2 420 and the switch3 430 (S300). In this case, the switch1 410 may transmit the first frame in a broadcast manner of a multicast manner. The first frame may be transmitted periodically or non-periodically.

Each of the switch2 420 and the switch3 430 may receive the first frame from the switch1 410. The switch2 420 may identify the request of the state information of the physical layer by receiving the first frame from the switch1 410 and identify the state of the PL-1. In this case, the switch2 420 may operate depending on a type of the state information of the physical layer requested by the first frame. For example, when the SNR information of the physical layer is requested, the switch2 420 may measure the SNR of the PL-1 based on the received first frame and generate a second frame including the measured SNR information of the PL-1. Here, the measured SNR information of the PL-1 may be included in at least one of the MAC header and the data field 506 of the second frame. Alternatively, the switch2 420 may generate the second frame, which does not include the SNR information of the PL-1, in simple response to the first frame so that the SNR of the PL-1 is measured by the switch1 410.

When the path loss information of the physical layer is requested, the switch2 420 may measure the path loss of the PL-1 (e.g., difference between transmission power of the first frame and reception power of the first frame) based on the transmission power information included in the first frame and generate the second frame including the measured path loss information of the PL-1. Here, the measured path loss information of the PL-1 may be included in at least one of the MAC header and the data field 506 of the second frame. Alternatively, when the transmission power information of the first frame is not included in the first frame, the switch2 420 may generate a second frame including transmission power information of the second frame so that the path loss of the PL-1 is measured based on the second frame by the switch1 410. Here, the transmission power information may be included in at least one of the MAC header and the data field 506 of the second frame.

When both of the SNR information and the path loss information of the physical layer are requested, the switch2 420 may perform the foregoing all operations. Also, the switch2 420 may determine the state of the PL-1 based on the measured SNR or path loss of the PL-1. For example, when the SNR of the PL-1 is satisfied with the predefined quality criterion (e.g., the SNR of the PL-1 is more than a minimum SNR required for quality of service (QoS)) or the path loss of the PL-1 is satisfied with the predefined quality criterion (e.g., the path loss of the PL-1 is less than a maximum path loss required for QoS), the switch2 420 may determine that the state of the PL-1 is the normal state. In an opposite case to the foregoing description, the switch2 420 may determine that the state of the PL-1 is the fault state. The switch2 420 may generate the second frame including the determined result of the state of the PL-1.

The switch2 420 may transmit the second frame which is generated based on the foregoing manner to the switch1 410 (S301).

The switch1 410 may receive the second frame in response to the first frame from the switch2 420 and identify the state of the PL-1 based on the received second frame. For example, the switch1 410 may obtain at least one of the SNR information and the path loss information of the PL-1 from the second frame and identify the state (e.g., normal state or fault state) of the PL-1 based on the identified information. Alternatively, when the transmission power information of the second frame is obtained from the second frame, the switch1 410 may measure the path loss of the PL-1 based on the obtained information (e.g., the transmission power information) and identify the state of the PL-1 based on the measured path loss of the PL-1. Alternatively, when the second frame in simple response to the first frame is received, the switch1 410 may measure the SNR of the PL-1 based on the received second frame and identify the state of the PL-1 based on the measured SNR of the PL-1. Alternatively, when the second frame includes information indicating whether the state of the PL-1 is the normal state or the fault state, the switch1 410 may identify the state of the PL-1 based on the information included in the second frame. On the other hand, when the second frame in response to the first frame is not received in a predefined time from the switch2 420, the switch1 410 may determine that the state of the PL-1 is a breaking state (e.g., the PL-1 is broken).

Meanwhile, the switch3 430 may identify that the state information of the physical layer is requested by receiving the first frame from the switch1 410. In this case, the switch3 430 may operate similar to the foregoing operations of the switch2 420. For example, the switch3 430 may generate the second frame including the state information (e.g., SNR information, path loss information, information indicating the normal state, information indicating the fault state, etc.) of the PL-2 or information used for measuring the path loss of the PL-2. Alternatively, the switch3 430 may generate the second frame in simple response to the first frame. The switch3 430 may transmit the generated second frame to the switch1 410.

The switch1 410 may receive the second frame in response to the first frame from the switch3 430 and identify the state of the PL-2 based on the received second frame. For example, the switch1 410 may identify the state of the PL-2 similar to the foregoing method for identifying the state of the PL-1. On the other hand, when the second frame in response to the first frame is not received in the predefined time from the switch3 430, the switch1 410 may determine that the state of the PL-2 is the breaking state (e.g., the PL-2 is broken).

Meanwhile, the switch2 420 may generate the first frame requesting the state information of the physical layer after transmitting the second frame and transmit the generated first frame to communication nodes (e.g., end node1 420-1, end node2 420-2, and switch4 440) which are connected to the switch2 420 (S302). In this case, the switch2 420 may transmit the first frame in the broadcast manner or the multicast manner. The first frame may include the indicator requesting the state information of the physical layer. In addition, the first frame may further include the transmission power information of the first frame. Here, each of the indicator and the transmission power information may be included in at least one of the MAC header and the data field 506 of the first frame. The first frame transmitted from the switch2 420 may be identical to the first frame transmitted from the switch1 410.

Each of the end node1 420-1, the end node2 420-2, and the switch4 440 may receive the first frame from the switch2 420. The end node1 420-1 may identify that the state information of the physical layer is requested by receiving the first frame from the switch2 420 and identify the state of the PL-3. In this case, the end node1 420-1 may operate depending on the type of the state information of the physical layer requested by the first frame. For example, when the SNR information of the physical layer is requested, the end node1 420-1 may measure the SNR of the PL-3 based on the received first frame and generate the second frame including the measured SNR information of the PL-3. Here, the measured SNR information of the PL-3 may be included in at least one of the MAC header and the data field 506 of the second frame. Alternatively, the end node1 420-1 may generate the second frame, which does not include the SNR information of the PL-1, in simple response to the first frame so that the SNR of the PL-3 is measured by the switch2 420.

When the path loss information of the physical layer is requested, the end node1 420-1 may measure the path loss of the PL-3 (e.g., difference between transmission power of the first frame and reception power of the first frame) based on the transmission power information included in the first frame and generate the second frame including the measured path loss information of the PL-3. Here, the measured path loss information of the PL-3 may be included in at least one of the MAC header and the data field 506 of the second frame. Alternatively, when the transmission power information of the first frame is not included in the first frame, the end node1 420-1 may generate the second frame including transmission power information of the second frame so that the path loss of the PL-3 is measured based on the second frame by the switch2 420. Here, the transmission power information may be included in at least one of the MAC header and the data field 506 of the second frame.

When both of the SNR information and the path loss information of the physical layer are requested, the end node1 420-1 may perform the foregoing all operations. Also, the end node1 420-1 may determine the state of the PL-3 based on the measured SNR or path loss of the PL-3. For example, when the SNR of the PL-3 is satisfied with the predefined quality criterion or the path loss of the PL-3 is satisfied with the predefined quality criterion, the end node1 420-1 may determine that the state of the PL-3 is the normal state. In an opposite case to the foregoing description, the end node1 420-1 may determine that the state of the PL-3 is the fault state. The end node1 420-1 may generate the second frame including the determined result of the state of the PL-3.

The end node1 420-1 may transmit the second frame which is generated based on the foregoing manner to the switch2 420 (S303).

The switch2 420 may receive the second frame in response to the first frame from the end node1 420-1 and identify the state of the PL-3 based on the received second frame. For example, the switch2 420 may obtain at least one of the SNR information and the path loss information of the PL-3 from the second frame and identify the state (e.g., normal state or fault state) of the PL-3 based on the identified information. Alternatively, when the transmission power information of the second frame is obtained from the second frame, the switch2 420 may measure the path loss of the PL-3 based on the obtained information (e.g., the transmission power information) and identify the state of the PL-3 based on the measured path loss of the PL-3. Alternatively, when the second frame in simple response to the first frame is received, the switch2 420 may measure the SNR of the PL-3 based on the received second frame and identify the state of the PL-3 based on the measured SNR of the PL-3. Alternatively, when the second frame includes information indicating whether the state of the PL-3 is the normal state or the fault state, the switch2 420 may identify the state of the PL-3 based on the information included in the second frame. On the other hand, when the second frame in response to the first frame is not received in the predefined time from the end node1 420-1, the switch2 420 may determine that the state of the PL-3 is a breaking state (e.g., the PL-3 is broken).

Meanwhile, the end node2 420-2 may identify that the state information of the physical layer is requested by receiving the first frame from the switch2 420. In this case, the end node2 420-2 may operate similar to the foregoing operations of the end node1 420-1. For example, the end node2 420-2 may generate the second frame including the state information (e.g., SNR information, path loss information, information indicating the normal state, information indicating the fault state, etc.) of the PL-4 or information used for measuring the path loss of the PL-4. Alternatively, the end node2 420-2 may generate the second frame in simple response to the first frame. The end node2 420-2 may transmit the generated second frame to the switch2 420 (S304).

The switch2 420 may receive the second frame in response to the first frame from the end node2 420-2 and identify the state of the PL-4 based on the received second frame. For example, the switch2 420 may identify the state of the PL-4 similar to the foregoing method for identifying the state of the PL-3. On the other hand, when the second frame in response to the first frame is not received in the predefined time from the end node2 420-2, the switch2 420 may determine that the state of the PL-4 is the breaking state (e.g., the PL-4 is broken).

Meanwhile, the switch4 440 may identify that the state information of the physical layer is requested by receiving the first frame from the switch2 420. In this case, the switch4 440 may operate similar to the foregoing operations of the switch2 420. For example, the switch4 440 may generate the second frame including the state information (e.g., SNR information, path loss information, information indicating the normal state, information indicating the fault state, etc.) of the PL-5 or information used for measuring the path loss of the PL-5. Alternatively, the switch4 440 may generate the second frame in simple response to the first frame. The switch4 440 may transmit the generated second frame to the switch2 420 (S305).

The switch2 420 may receive the second frame in response to the first frame from the switch4 440 and identify the state of the PL-5 based on the received second frame. For example, the switch2 420 may identify the state of the PL-5 similar to the foregoing method for identifying the state of the PL-1. On the other hand, when the second frame in response to the first frame is not received in the predefined time from the switch4 440, the switch2 420 may determine that the state of the PL-5 is the breaking state (e.g., the PL-5 is broken).

After that, the switch2 420 may generate a third frame including the state information (e.g., SNR information, path loss information, information indicating the normal state, information indicating the fault state) of each of the PL-3, the PL-4, and the PL-5. The state information of each of the PL-3, the PL-4, and the PL-5 may be included in at least one of the MAC header and the data field 506 of the third frame. Alternatively, the switch2 420 may generate the third frame including information of the physical layer belonging to the normal state (or, information of the physical layer belonging to the fault state). The information of the physical layer belonging to the normal state (or, information of the physical layer belonging to the fault state) may be included in at least one of the MAC header and the data field 506 of the third frame. The switch2 420 may transmit the third frame to the switch1 410 (S306). The switch1 410 may receive the third frame from the switch2 420 and identify the state of the physical layer (PL-3, PL-4, and PL-5), the physical layer belonging to the normal state, the physical layer belonging to the fault state, and so on based on the received third frame (S307).

Meanwhile, after transmitting the second frame to the switch1 410, the switch3 430 may generate the first frame so at to identify the state information of the physical layer of communication nodes (e.g., end node3 430-1, end node4 430-2, and switch4 440) which are connected to the switch3 430. The switch3 430 may transmit the generated first frame to the end node3 430-1, the end node4 430-2, and the switch4 440. In this case, the switch3 430 may transmit the first frame in the broadcast manner or the multicast manner. The first frame may include the indicator requesting the state information of the physical layer. In addition, the first frame may further include the transmission power information of the first frame. Here, each of the indicator and the transmission power information may be included in at least one of the MAC header and the data field 506 of the first frame. The first frame transmitted from the switch3 430 may be identical to the first frame transmitted from the switch1 410.

The end node3 430-1 may identify that the state information of the physical layer is requested by receiving the first frame from the switch3 430. In this case, the end node3 430-1 may operate similar to the foregoing operations of the end node1 420-1. For example, the end node3 430-1 may generate the second frame including the state information (e.g., SNR information, path loss information, information indicating the normal state, information indicating the fault state, etc.) of the PL-6 or information used for measuring the path loss of the PL-6. Alternatively, the end node3 430-1 may generate the second frame in simple response to the first frame. The end node3 430-1 may transmit the generated second frame to the switch3 430.

The switch3 430 may receive the second frame in response to the first frame from the end node3 430-1 and identify the state of the PL-6 based on the received second frame. For example, the switch3 430 may identify the state of the PL-6 similar to the foregoing method for identifying the state of the PL-3. On the other hand, when the second frame in response to the first frame is not received in the predefined time from the end node3 430-1, the switch3 430 may determine that the state of the PL-6 is the breaking state (e.g., the PL-6 is broken).

Meanwhile, the end node4 430-2 may identify that the state information of the physical layer is requested by receiving the first frame from the switch3 430. In this case, the end node4 430-2 may operate similar to the foregoing operations of the end node1 420-1. For example, the end node4 430-2 may generate the second frame including the state information (e.g., SNR information, path loss information, information indicating the normal state, information indicating the fault state, etc.) of the PL-7 or information used for measuring the path loss of the PL-7. Alternatively, the end node4 430-2 may generate the second frame in simple response to the first frame. The end node4 430-2 may transmit the generated second frame to the switch3 430.

The switch3 430 may receive the second frame in response to the first frame from the end node4 430-2 and identify the state of the PL-7 based on the received second frame. For example, the switch3 430 may identify the state of the PL-7 similar to the foregoing method for identifying the state of the PL-3. On the other hand, when the second frame in response to the first frame is not received in the predefined time from the end node4 430-2, the switch3 430 may determine that the state of the PL-7 is the breaking state (e.g., the PL-7 is broken).

Meanwhile, the switch4 440 may identify that the state information of the physical layer is requested by receiving the first frame from the switch3 430. In this case, the switch4 440 may operate similar to the foregoing operations of the switch2 420. For example, the switch4 440 may generate the second frame including the state information (e.g., SNR information, path loss information, information indicating the normal state, information indicating the fault state, etc.) of the PL-8 or information used for measuring the path loss of the PL-8. Alternatively, the switch4 440 may generate the second frame in simple response to the first frame. The switch4 440 may transmit the generated second frame to the switch3 430.

The switch3 430 may receive the second frame in response to the first frame from the switch4 440 and identify the state of the PL-8 based on the received second frame. For example, the switch3 430 may identify the state of the PL-8 similar to the foregoing method for identifying the state of the PL-3. On the other hand, when the second frame in response to the first frame is not received in the predefined time from the switch4 440, the switch3 430 may determine that the state of the PL-8 is the breaking state (e.g., the PL-8 is broken).

After that, the switch3 430 may generate the third frame including the state information of each of the PL-6, the PL-7, and the PL-8. The state information of each of the PL-6, the PL-7, and the PL-8 may be included in at least one of the MAC header and the data field 506 of the third frame. Alternatively, the switch3 430 may generate the third frame including information of the physical layer belonging to the normal state (or, information of the physical layer belonging to the fault state). The information of the physical layer belonging to the normal state (or, information of the physical layer belonging to the fault state) may be included in at least one of the MAC header and the data field 506 of the third frame. The switch3 430 may transmit the third frame to the switch1 410. The switch1 410 may receive the third frame from the switch3 430 and identify the state of the physical layer (PL-6, PL-7, and PL-8), the physical layer belonging to the normal state, the physical layer belonging to the fault state, and so on based on the received third frame (S307).

Meanwhile, after transmitting the second frame to at least one of the switch2 420 and the switch3 430, the switch4 440 may generate the first frame requesting the state information of the physical layer and transmit the generated first frame to the end node5 440-1 and the end node6 440-2. In this case, the switch4 440 may transmit the first frame in the broadcast manner or the multicast manner. The first frame may include the indicator requesting the state information of the physical layer. In addition, the first frame may further include the transmission power information of the first frame. Here, each of the indicator and the transmission power information may be included in at least one of the MAC header and the data field 506 of the first frame. The first frame transmitted from the switch4 440 may be identical to the first frame transmitted from the switch1 410.

The end node5 440-1 may identify that the state information of the physical layer is requested by receiving the first frame from the switch4 440. In this case, the end node5 440-1 may operate similar to the foregoing operations of the end node1 420-1. For example, the end node5 440-1 may generate the second frame including the state information (e.g., SNR information, path loss information, information indicating the normal state, information indicating the fault state, etc.) of the PL-9 or information used for measuring the path loss of the PL-9. Alternatively, the end node5 440-1 may generate the second frame in simple response to the first frame. The end node5 440-1 may transmit the generated second frame to the switch4 440.

The switch4 440 may receive the second frame in response to the first frame from the end node5 440-1 and identify the state of the PL-9 based on the received second frame. For example, the switch4 440 may identify the state of the PL-9 similar to the foregoing method for identifying the state of the PL-1. On the other hand, when the second frame in response to the first frame is not received in the predefined time from the end node5 440-1, the switch4 440 may determine that the state of the PL-9 is the breaking state (e.g., the PL-9 is broken).

Meanwhile, the end node6 440-2 may identify that the state information of the physical layer is requested by receiving the first frame from the switch4 440. In this case, the end node6 440-2 may operate similar to the foregoing operations of the end node1 420-1. For example, the end node6 440-2 may generate the second frame including the state information (e.g., SNR information, path loss information, information indicating the normal state, information indicating the fault state, etc.) of the PL-10 or information used for measuring the path loss of the PL-10. Alternatively, the end node6 440-2 may generate the second frame in simple response to the first frame. The end node6 440-2 may transmit the generated second frame to the switch4 440.

The switch4 440 may receive the second frame in response to the first frame from the end node6 440-2 and identify the state of the PL-10 based on the received second frame. For example, the switch4 440 may identify the state of the PL-10 similar to the foregoing method for identifying the state of the PL-1. On the other hand, when the second frame in response to the first frame is not received in the predefined time from the end node6 440-2, the switch4 440 may determine that the state of the PL-10 is the breaking state (e.g., the PL-10 is broken).

After that, the switch4 440 may generate the third frame including the state information of each of the PL-9 and the PL-10. The state information of each of the PL-9 and the PL-10 may be included in at least one of the MAC header and the data field 506 of the third frame. Alternatively, the switch4 440 may generate the third frame including information of the physical layer belonging to the normal state (or, information of the physical layer belonging to the fault state). The information of the physical layer belonging to the normal state (or, information of the physical layer belonging to the fault state) may be included in at least one of the MAC header and the data field 506 of the third frame. The switch4 440 may transmit the third frame to at least one of the switch2 420 and the switch3 430. When the third frame is received from the switch4 440, each of the switch2 420 and the switch3 430 may transmit the third frame to the switch1 410. When the third frame is received from the switch2 420 or the switch3 430, the switch1 410 may identify the state of the physical layer (PL-9 and PL-10), the physical layer belonging to the normal state, the physical layer belonging to the fault state, and so on based on the received third frame (S307).

As foregoing operations, the switch1 410 may identify the state of the physical layer (e.g., PL-1, PL-2, PL-3, PL-4, PL-5, PL-6, PL-7, PL-8, PL-9, and PL-10) and set the communication path based on the state of the physical layer (S308). For example, in a case that the communication path between the switch1 410 and the end node5 440-1 is set to "PL-1-PL-5-PL-9," the switch1 410 may reset the communication path between the switch1 410 and the end node5 440-1 to "PL-2-PL-8-PL-9" when the PL-5 is broken or the state of the PL-5 is not satisfied with the predefined quality criterion.

Meanwhile, the OBD device 400 may transmit a fourth frame requesting the state information of the physical layer to the switch1 410 (S309). Here, the OBD device 400 may transmit the fourth frame to the switch1 410 periodically or non-periodically. The fourth frame may include the indicator requesting the state information of the physical layer. The indicator may be included in at least one of the MAC header and the data field 506 of the fourth frame. When the fourth frame is received from the OBD device 400, the switch1 410 may generate a fifth frame including the state information of the physical layer (e.g., PL-1, PL-2, PL-3, PL-4, PL-5, PL-6, PL-7, PL-8, PL-9, and PL-10), information of the physical layer belonging to the normal state, or information of the physical layer belonging to the fault state and transmit the generated fifth frame to the OBD device 400 (S310). The OBD device 400 may receive the fifth frame from the switch1 410 and identify the state of the physical layer (e.g., PL-1, PL-2, PL-3, PL-4, PL-5, PL-6, PL-7, PL-8, PL-9, and PL-10) based on the information included in the received fifth frame.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An operation method of a first switch in an Ethernet-based vehicle network, the method comprising:
    transmitting, by the first switch, a first frame requesting state information of a physical layer unit to a second switch, the second switch is physically connected to the first switch;
    receiving, by the first switch, a second frame including state information indicating whether the physical layer unit included in the second switch is in a normal state or a fault state from the second switch;
    receiving, by the first switch, a third frame including state information indicating whether a physical layer unit included in each of end nodes physically connected to the second switch is in the normal state or the fault state from the second switch; and
    when the physical layer unit included in the second switch is in the normal state, the physical layer unit included in one or more end nodes among the end nodes is in the normal state, and the physical layer unit included in remaining end nodes among the end nodes is in the fault state, setting, by the first switch, a communication path between the first switch, the second switch, and the one or more end nodes except for the remaining end nodes operating in the fault state,
    wherein each of the first switch, the second switch, and the end nodes includes the physical layer unit and a controller unit.

2. The method according to claim 1, wherein the state information further indicates at least one of signal to noise ratio (SNR) information and path loss information of the physical layer unit.

3. The method according to claim 1, wherein the first frame includes transmission power information of the first frame.

4. The method according to claim 1, wherein the first frame is transmitted in a broadcast manner.

5. The method according to claim 1, wherein the third frame further includes at least one of SNR information and path loss information of the physical layer unit, and the SNR information and the path loss information are measured based on the first frame.

6. The method according to claim 1, wherein the third frame further includes transmission power information of the third frame.

7. The method according to claim 1, wherein each of the first frame, the second frame, and the third frame is generated based on an Ethernet protocol.

8. The method according to claim 1, further comprising transmitting, by the first switch, a fourth frame including the state information of the physical layer unit to an on-board diagnostic (OBD) device.

9. The method according to claim 1, further comprising:
    transmitting, by the first switch, a fourth frame including information of the physical layer unit which is in the fault state to an OBD device.

10. An operation method of a first switch in an Ethernet-based vehicle network, the method comprising:
    receiving, by the switch, a first frame requesting state information of a physical layer unit from a second switch, the second switch is physically connected to the first switch;
    transmitting, by the first switch, the first frame to end nodes physically connected to the first switch;
    receiving, by the first switch, a second frame in response to the first frame from the end nodes;
    determining, by the first switch, whether the physical layer unit included in each of the end nodes is in a normal state or a fault state based on the second frame;
    when the physical layer unit included in one or more end nodes among the end nodes is in the normal state and the physical layer unit included in remaining end nodes among the end nodes is in the fault state, transmitting, by the first switch, a third frame including information of the one or more end nodes except for the remaining end nodes among the end nodes to the second switch; and
    performing, by the first switch, communications through a communication path between the first switch, the second switch, and the one or more end nodes except for the remaining end nodes operating in the fault state, wherein each of the first switch, the second switch, and the end nodes includes the physical layer unit.

11. The method according to claim 10, wherein the state information further includes at least one of signal to noise ratio (SNR) information and path loss information of the physical layer unit.

12. The method according to claim 11, wherein the state information further includes the SNR information, and the physical layer unit is determined to be in the normal state when a SNR indicated by the SNR information is more than a minimum SNR required for quality of service (QoS).

13. The method according to claim 10, wherein the first frame further includes transmission power information of the first frame.

14. The method according to claim 11, wherein the state information includes the path loss information, and the physical layer unit is determined to be in the normal state when a path loss indicated by the path loss information is less than a maximum path loss required for quality of service (QoS).

15. The method according to claim 10, wherein the second frame further includes transmission power information of the second frame.

16. The method according to claim 10, wherein each of the first frame, the second frame, and the third frame is generated based on an Ethernet protocol.

* * * * *